June 2, 1925.
R. W. JONES
PHOTOGRAPHIC PRINTING
Filed May 3, 1922
1,540,399
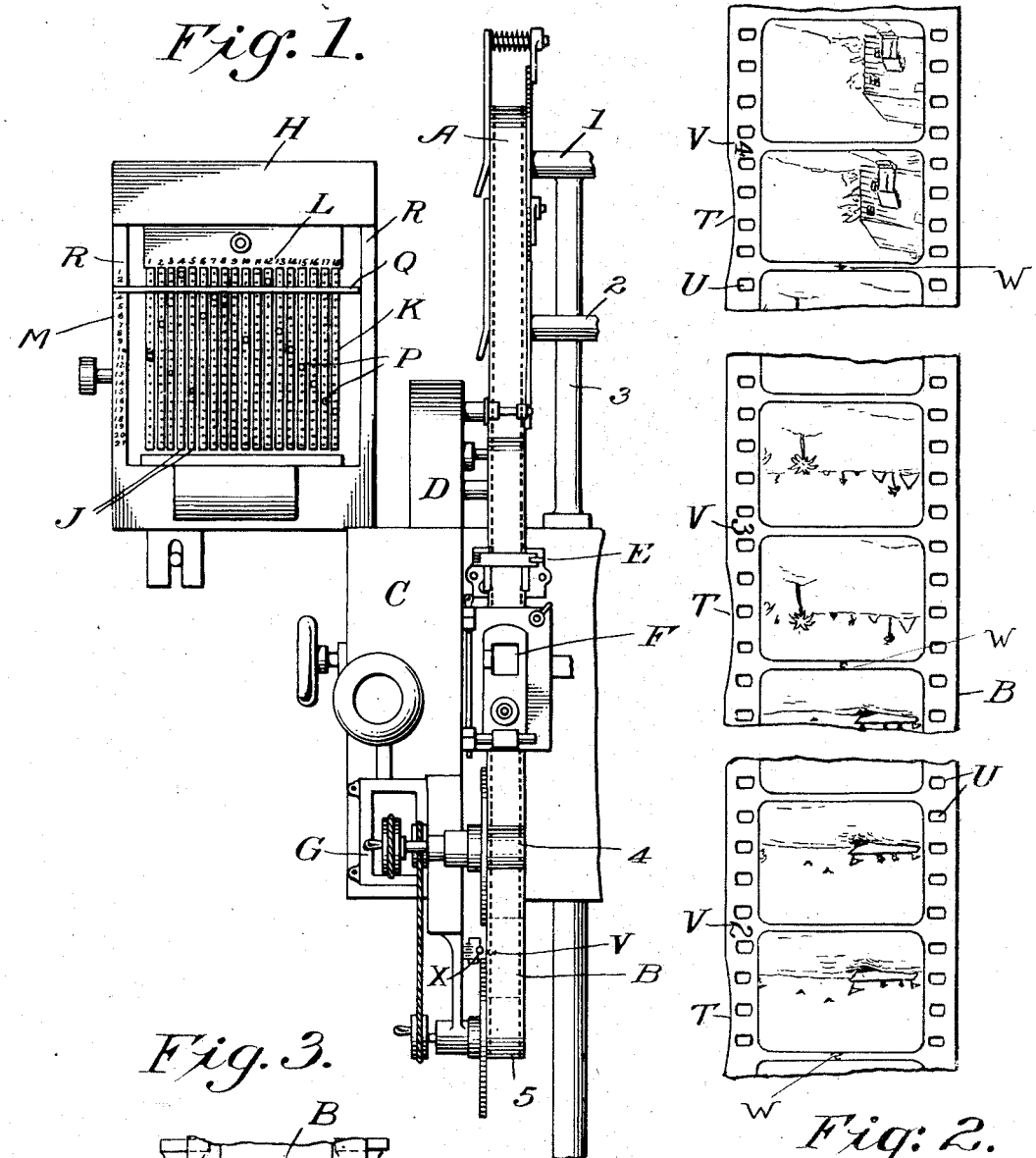
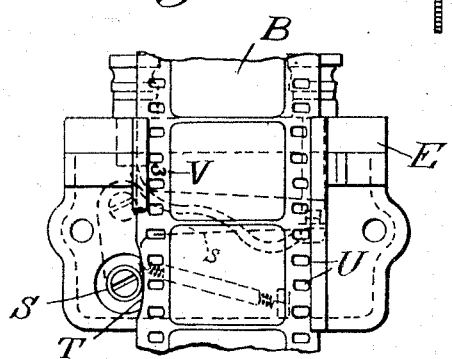
Inventor
Robert W. Jones
By Ralph S. Warfield.
Attorney Patented June 2, 1925.

1,540,399

UNITED STATES PATENT OFFICE.

ROBERT W. JONES, OF WILKES-BARRE, PENNSYLVANIA.

PHOTOGRAPHIC PRINTING.

Application filed May 3, 1922. Serial No. 558,063.

*To all whom it may concern:*

Be it known that I, ROBERT W. JONES, a citizen of the United States, residing in the city of Wilkes-Barre, Luzerne County, Pennsylvania, have invented new and useful Improvements in Photographic Printing, of which the following is a specification.

My invention relates more particularly to means for checking the operation of photographic printing machines, to the end that the positive shall be printed from the negative by a light of the proper or predetermined intensity.

While the invention is adapted for use in a number of ways and with a variety of machines, I have chosen to illustrate one of its uses in connection with a photographic printing machine designed for what is known as the "contact" printing of positive films from negative films used in the motion picture art.

Such printing machines, are well known in the art and are exemplified for instance, in the Bell & Howell, and Duplex machines now on the market.

In such machines, the developed negative film and the sensitized positive film are led in contact with each other from the rolls, past an aperture behind which is a printing light, to print the successive pictures of the negative film on the positive film, after which the respective films are rewound in rolls on the opposite side of the printing aperture.

As several copies of the developed negative film are generally required, the rewound negative roll is replaced on the upper spindle and a new positive film provided so that the printing process can be repeated as often as desired.

The rolls of exposed sensitized positive films are taken from the printing room to a winding room where they are wound on frames which are then placed in the vats or tanks of developer, fixed in the "hypo", and washed. The positive film, while still on the frames, is then tinted, toned, etc., if such is necessary, after which it is wound on large drums to be dried, each drum holding several rolls.

After drying, the several lengths of positive film are rewound, and assorted so that all rolls of duplicate films are in the same tier, and if the complete filmed story, travelogue, or what not, consists of more than one roll, the several rolls constituting such film story are assembled into separate tiers.

Even then the work is not completed as it is necessary to patch or cement the comparatively short pieces of film together to form a reel of film of the proper length, the patched or cemented film then being passed through a polishing machine to remove water marks, or extraneous matter adhering thereto, after which the film is run through a projecting machine for inspection.

Upon such inspection, if it is found that a portion of the positive film has been misprinted, that particular part is cut out of the positive film, and the corresponding part of the negative or original film is run through the printing machine in contact with a new piece of sensitized film for reprinting.

Such reprinted piece of film must then pass through the entire process of developing, fixing, washing, tinting, if necessary, drying, and polishing, after which it is cemented to the main portion of the positive film in place of the misprinted portion cut therefrom.

And the cost of reprinting and treating such section of film to be substituted for the misprinted section materially increases the cost of printing the film.

In printing the positive film, it is highly advisable, in order to bring out the picture as clearly as possible, that the degree of intensity of the printing light be regulated in accordance with the density of the pictures on the negative film as the positive and negative films pass the printing aperture, so that the lights and shades in the pictures on the positive film shall be as nearly uniform as possible, or of the proper density for the particular scenes.

Such variation in the density of the negative film which causes parts or sections of the film when developed, to be darker or lighter, results from taking several scenes under different lighting conditions.

This is particularly true in educational pictures, and nature films, which must often be taken under lighting conditions which are not of the best.

It has been customary in commercial printing machines to provide means to vary the degree of intensity of the printing light, either by increasing or reducing the resistance in the lighting circuit, or by enlarging or reducing the size of the printing aperture, or by screening or unscreening the light.

Originally, the light intensity, controlled in any of the above ways, was operated manually, and even today there are hand machines, so-called, wherein the operator is expected to manually control the light intensity in accordance with the variations in density of the sections of the negative film.

On account of the sensitized positive film, it is necessary to conduct the printing in a "dark room" illuminated dimly by a red shaded lamp, and in order to enable the operator to know when it is necessary to vary the intensity of the printing light by hand, it is customary to provide a card or index on which is written indicia stating that the first 20 feet of film is to be printed with a light of a certain degree of intensity, the next 15 feet to be printed with a light of another degree of intensity, the following 30 feet to be printed with a light of still another intensity or possibly with a light of the first degree of intensity used, and so on, a counter being provided which automatically registers the number of feet of film as it is drawn off of the roll, and sometimes the subject matter portrayed on the different sections of the film is set forth.

Obviously, this requires a very great degree of attention and concentration on the part of the operator, who must closely watch the ever-changing dials of the counter and compare the reading with the index card continuously, in order to know when to regulate the light intensity. This becomes very tiresome and monotonous and the slightest inattention will result in misprinting a section of the film.

As the art advanced, printing machines were provided having means to automatically vary the light intensity, and one of the best schemes which is widely used, is to employ what is known as a "light change box" which is in the nature of a rheostat, arranged in the light circuit, and provided with a switch, the box and switch being relatively movable, step by step. The movable element, as the switch, is adapted to cut resistance coils in or out of the light circuit to vary the intensity of the printing light, the step by step travel of the movable element being controlled by a feed mechanism preferably electrical, and including a feeler finger arranged adjacent to the path of travel of the negative film, and adapted to ride against the edge of the negative film as the latter feeds past. The edge of the negative film is notched at or near the beginning of each section of different density and as such notch comes opposite to and passes the feeler finger, the latter drops into the notch and closes the feed circuit and then is forced outward by the unnotched edge of the film to break the circuit, thereby effecting a one-step advance of the movable element to vary the amount of resistance in the light circuit.

The light change box or rheostat includes a series of rows of seats to accommodate plugs or pins with which the switch element coacts, the plugs or pins being inserted by the operator prior to printing the positive. There are as many numbered vertical and parallel rows of seats as there are varying intensities of light, for which the printing machine is arranged, there being approximately as many seats in each vertical row as there are scenes or sections of a film of a certain length, the rows being numbered vertically as well as horizontally, to indicate the number of scenes or sections for which the box can be used. The switch bar extends across the field of seats and is fed downwardly step by step from the first horizontal row to the last.

It is sometimes customary to make "tests" of the several sections of different densities of the negative film, with light of varying intensities, to determine the light of the proper degree of intensity to use when printing the several scenes, a card being made out in accordance with the results of the tests and the resistance-controlling pins being plugged in on the rheostat or light change box, in accordance with the information on the card.

One would imagine that this arrangement and printing method, would almost entirely eliminate the personal equation, and that the positive film would be accurately printed, but there are additional factors to be considered which render this process liable to error.

In filming a story, it is customary to take several scenes involving the same setting, let us say, as in a drawing room, for example, at one time, even though these successively taken scenes may be scattered through the pictorially represented story in different places.

Then there are also the "retakes" to be considered, as when the action of the story is accidentally interrupted, ineffectively acted, and hence unsatisfactory, or what not.

The original or negative film, after being developed, is criticized, cut and pieced, titles inserted, and scenes properly arranged in the order in which the story is to be unfolded or delineated, rather than in the order in which the scenes were originally taken.

After the original or negative film is completed, it is practically a patchwork, the ends of film portraying the successive scenes, with the titles or explanatory reading, as they will appear to the public, being cemented together, to form a reel of film.

The scenes of the original film or negative are now ready for printing on the commercial or positive films, which are distributed in picturizations of one or more reels to the moving picture theatres for exhibition to the public.

It frequently happens that the notches on the sides of the negative film, above referred to, may not be cut deeply enough to allow the feeler finger to drop sufficiently to control the magnet circuit, and consequently no change in the intensity of the light will occur at the beginning of a scene where such change is intended. On the other hand, a notch may be cut too deeply, so as to weaken the edge of the film, and the feeler finger will partially climb out of the notch and then bend the edge of the film and make a second and unnecessary contact, causing a second change in the degree of intensity of the printing light, in addition to that which was intended for the following scene.

Furthermore, the cemented or patched ends of the negative film often become loosened at the edges of the film, and where such partial disengagement occurs, an unintentional notch is formed, which will effect an undesired operation of the switch with a consequent undesired change of light, which will vary the density of the various scenes following the uncemented patch. If these errors in printing are not discovered immediately and rectified by the operator, they are not detected until found by the inspectors, after the film has had considerable work expended thereon.

Naturally, some of these accidents are to be avoided, and it is customary for the operators, if they imagine something wrong, to count the notches by drawing the negative film between the fingers, and note the position of the switch bar relatively to the numbered rows of scenes or film sections on the "light change box".

Thus, if six notches have passed through their fingers and the switch bar is in its seventh position, (there being no notch for the first section of film) they may be fairly certain that, if they have consistently kept track of the preceding light changes, the film and the light change box have operated in coincidence to that point.

This plan is fraught with liability of mistake, as the operator may miscount the number of notches. Furthermore, a shallow notch may have failed to trip the switch bar, and the occurrence of a partially loosened cemented section may have caused the undesired tripping of the switch bar, so that when the operator checks the position of the switch bar with the notches, the count is apparently correct.

This being the case, it is obvious that many feet of commercial film may be printed with light of the wrong intensity. For example, if in a roll of 18 scenes, or variations in density, the notch at the end of scene 2 which controls the light intensity for scene 3 fails to trip the switch bar of the light change box, and the notch at the end of scene 4 does trip the switch, it is plain that scene 3 will have been printed with a light of the intensity designed for scene 2, and that scene 4 will be printed with a light of an intensity designed for the printing of scene 3, and so on.

Now, assume that a partially cemented patch in scene 4 again trips the switch, the remainder of scene 4 will be printed with light of the desired intensity, as will the following scenes, providing no further errors occur, and the operator, should she be unaware of the error, will pass the film with scene 3 and a part of scene 4 incorrectly printed.

This error will, of course, appear only after the commerical film is developed and projected in the test projection, and will require a "reprint" of that portion of the film which is improperly printed, and the insertion of the developed "reprint" in the commercial film.

My invention is designed to reduce to a minimum the liability of errors as above set forth, one object being to provide a novel and simple means for checking the printing of positives from negatives, which shall be as accurate as is possible, in view of the necessity for the intervention of the human element. As one result of my invention, the amount of positive stock necessary to be reprinted is very greatly reduced, as is the labor and expense of processing the positive stock after its exposure, in cases where misprinting has occurred.

This saving of positive or sensitized stock by preventing misprinting due to incorrect light intensities reduces the cost of making a film, and the close attention, and inspection of the picture as it is being printed, and continual comparison of a counter or index card with a film is eliminated. My invention is further designed and intended to supplement the present method of commercial printing of moving pictures, and serves as a means whereby the operator may check the actual printing with the intended printing of such pictures, to the end that in case errors occur due to faults in the film, for example, which tend to vary the predetermined and desired light changes, the operator, by the aid of my invention, will immediately become aware of such errors, and can correct them with the loss of a minimum amount of film, time, and labor.

Other objects and advantages will be more fully set forth hereinafter and particularly pointed out in the claims.

In the accompanying drawings, Fig. 1 is a view in front elevation, of a well known form of photographic printing machine;

Fig. 2 is a detail view of a piece of the negative film notched along its edge at points where the intensity of the printing light is to be changed; and Fig. 3 is an enlarged detail view of a piece of film bearing my invention, and associated with the feeler finger, showing the latter entered in the notch.

Referring to the drawings, the roll of positive or sensitized film A is mounted on a spindle 1, and the roll of negative or original film B is journaled on a similar spindle 2, located below and a little behind the spindle 1, both spindles being carried by a post 3 projecting above the body C of the machine.

The ends of the positive and negative films, the former being led downwardly in front of the latter, are threaded through the feed and tensioning mechanism D, the usual loops (not shown) being then formed in the two films, after which the films enter a track leading through the breaker box E, and thence past the exposure aperture F, from which they are wound on rolls 4 and 5 driven by the take-up mechanism G.

In the well-known form of photographic printer herein chosen for illustration in connection with my invention, the printing light (not shown) contained within the body C of the machine, is controlled as to its intensity by a "light change box" or rheostat H, comprising a plurality of vertically extending parallel bars J, each of which is provided with a vertically extending row of holes or seats K.

The bars J or the vertical rows of seats K are numbered 1, 2, 3, etc. as at L, in a horizontal line at the top of the bars to denote the various light changes or degrees of intensity of the printing light, and the horizontal rows of seats K are differentiated by a vertical line of consecutive numbers M, to designate the number of scenes or changes of density of a film.

In the present instance, the light change box is adapted for 18 variations of light intensity and for 21 scenes or changes of film density, but obviously these limitations may be varied to suit the line of work to be performed.

Contact plugs P are inserted in such of the various seats K in accordance with the desired degrees of intensity of light by which it is desired to print the successive scenes or sections of the negative film.

A horizontal switch or light controlling bar Q traveling between parallel vertical guides R located at opposite ends of the horizontal rows of seats K, extends across the bars J, over the horizontal rows of seats, and is adapted to be stepped successively from top to bottom of the field of seats, by an electro-magnetic mechanism escapement, not shown.

As the switch Q steps from row to row of the horizontal series of seats, it contacts with the plug P located in each row to put the requisite amount of resistance in circuit with the printer light to regulate the intensity of the printing light.

The switch escapement of any suitable form, not shown, is controlled by a feeler finger S pivotally mounted in the breaker box E, one arm of the feeler finger being spring-pressed to contact the adjacent edge of the negative film B, which is notched, as shown at T, (Figs. 2 and 3), at points where the density of the negative requires a change in intensity of the printing light, to print the scenes or successive sections uniformly, or of the desired density, on the positive film.

When the notch T at the end of each section or scene of the negative film in its travel, comes to a point opposite the free arm of the feeler finger S, the latter enters the notch and enables the opposite arm of the finger to close a circuit (not shown) to energize the switch escapement mechanism and step the switch Q to the next horizontal row of seats K, and thereby, if necessary, effect a change in the intensity of the printing light in printing the following scene or film section.

The switch escapement makes a slight noise or buzz as the switch Q is stepped from row to row M, of the seats K, which notifies the operator that a change of intensity of the printing light has occurred, and that another scene is being printed.

The foregoing mechanism is old and well-known in the art, and forms a part of my invention only in so far as it cooperates with the novel features hereinafter set forth.

As heretofore pointed out, the notches T, which are formed at certain points in the negative film where variations in density begin, may not be cut deeply enough to enable the feeler finger S to close the circuit controlling the switch escapement.

Or, a notch may be cut so deeply as to weaken the edge of the film, so that, after the switch bar Q, has passed to the proper position, and the film continues its travel, the feeler finger will be partially restored to its normal position, breaking the escapement circuit, after which the weakened film edge will bend, permitting the feeler finger to again close the escapement circuit and effect a second and premature advance of the switch element Q to the plug P inserted in the row of horizontal seats K appropriated to the next scene or change of density of the film which has not yet been fed to the printing aperture.

Or, a cemented patch may loosen, forming in effect, a notch to permit the unintentional operation of the switch Q, or the edge of the film may become accidentally torn or broken, and effect the same unintentional operation of the switch.

Any of these or other occurrences will operate to misprint a portion of the positive film, necessitating additional labor, time and expense to rectify the error.

In order to avoid as far as humanly possible, the liability of misprinting due to the existence of the defects above noted, I have conceived the idea of providing a means to enable the operator to positively check the successive film sections or scenes with the position of the switch element Q, so that the operator may positively assure himself from time to time that the scenes are being printed in accordance with the set up of the light change mechanism.

And my checking means relieves the operator of the necessity of close attention to the number of feet of film run through the machine, or a comparison thereof with an index card, as well as of an inspection of the film during its printing to distinguish the particular pictures being printed from time to time.

To this end, I arrange to apply monitor numerals or other indicia directly to the film, such numerals or indicia corresponding with the numerals or indicia M, designating and distinguishing the various scenes or changes of density provided for on the light change box H.

In the present instance, and because of its convenience, I have shown the negative or master film provided with numerals 1, 2, 3, etc. placed, for instance, along the left hand edge of the film between the usual sprocket holes U, as indicated at V, although if desired, the monitor numerals, or other indicia, may be located in the narrow separating lines between the individual pictures on the film, as indicated at W (Fig. 2).

These monitor numerals, or other indicia, should be located near the beginning of the sections of film wherein changes of density occur, and if desired, may be placed at either one or a plurality of places along the film.

Thus the film at the commencement of scene 1 will have a "1" applied to the edge of the film or on one of the separating lines between the individual pictures of the scene; at the beginning of scene 2, or at the point where a change in the intensity of the light is required, the monitor numeral "2" will be applied to the film, and so on. The figures will be in white so that they will be readily visible.

The figures 1, 2, 3, etc. will appear, for example, along the side edge of the film, and correspond with the vertical row of figures M, indicating the successive scenes or changes of density on the light change box, and may be applied at the same time that the negative or master film is notched.

With the film bearing such monitor-numerals passing through the printing machine, the operator, at every "buzz", may glance at the numeral V, on that portion of the film which has just passed through the printing machine, compare it with the position of the switch or contact bar Q, with relation to the numeral in the vertical row M, on the light change box indicating the scene which should be in process of printing at that time, and if the numerals correspond, she will know that the switch bar Q, has regulated the light in accordance with the degree or intensity desired for the particular scene at that time passing across the printing aperture.

Should a partially cemented patch or a weakened edge of the film cause an unintentional operation of the switch bar Q, the operator, upon hearing the buzz, and inspecting the scene number V, placed on the film, and comparing it with the number of the scene on the light change box opposite which the switch bar Q, lies at that moment, will note the dissimilarity in the numbers and stop the printing, knowing that a short piece of scene only has been improperly printed instead of several scenes, thus saving many feet of film.

The operator should inspect the film from time to time to compare the monitor numeral V, of the scene or film section being printed, with the numeral or other indicia indicating the position of the switch element Q, in its travel past the successive rows of seats K for the respective scenes or film sections, and will thus detect any misprint due to the presence of a too shallow notch T, which has not permitted an operation of the switch bar Q.

As the illumination in a photographic printing room is necessarily dim because of the sensitized film, I may provide a safe light X, located adjacent the take-up roll 5 for the master or negative film, to enable the operator to readily discern the monitor indicia thereon.

The numeral on the separating line between pictures of a scene may indicate the number of the scene or the number corresponding to the degree or intensity of light by which such scene is to be printed, and in the latter case, the operator can tell whether the plug P has been placed in the proper socket or seat K, as well as whether the switch bar Q, has shifted to the plug for the proper scene, by comparing the two sets of numerals on the film with the two sets of numerals on the light change box.

The indicia along the edge of the film or between pictures are applied by hand, or otherwise, after the scenes forming the original (negative) film have been assembled in the desired order and may be applied in any convenient, or desired manner, as by painting, punching, or stamping, and may be used when printing or inspecting. If printed or painted, a pigment may be employed which will not be removed by the usual cleaning process, but which may be readily removed by the application of a suitable eradicator.

Obviously, the monitor indicia V, or W, will be printed on the positive films, but as the indicia lie outside the picture spaces, this is not a disadvantage, and the information as to the intended scene or light intensity can then be gained from an inspection of the positive film.

It is customary for film makers to print on the longitudinal edge of the sensitized film, as it is manufactured, successive serial numbers about a foot apart. These numbers, of course, do not appear, nor can they be inspected until after the film is developed, and they cannot take the place of the scene or section numerals forming the subject matter of this invention, because, after the original film has been exposed and patched up, the manufacturer's printed numbers would not follow in sequence, nor would they correspond with the indicia on the light change box.

In some photographic printing machines, it may be possible to shift the field of seats and plugs relatively to a stationary switch element, and the appended claims are intended to cover my invention when used with either form of rheostat member, or with those machines wherein no rheostat whatever is used, as where the size of the aperture is mechanically regulated.

Changes may be made in the photographic printer with which films bearing my invention are used, without departure from the spirit and scope of the invention, which relates primarily to the application of monitor or check indicia to the film to correspond with similar indicia on the means regulating the intensity of the printing light.

What I claim as new, is:—

1. The combination in a photographic printing machine, with a light change box having a switch bar adapted to be progressively advanced step by step, to regulate the intensity of the printing light, indicia correlated with the switch bar to distinguish the several steps, a feeler to control the step by step advance of the switch bar; and a negative ribbon film having sections of varying densities, adapted to travel past the feeler, the negative ribbon having spaced mutilations to control the operation of the feeler; indicia applied to the sections of the film of varying densities to distinguish the latter, such indicia adapted to correspond with the indicia which distinguish the several step advances of the switch bar.

2. The combination in a printing machine, with means to control the intensity of the printing light, including a shiftable switch member, indicia to distinguish the successive positions of the switch member, a feeler to control the advance of the switch member; and a negative film adapted to travel past the feeler which lies in contact therewith, the film comprising sections of varying densities, and being notched adjacent the beginning of such sections of varying densities, to permit the operation of the feeler and the consequent advance of the switch member; of distinguishing indicia applied to the sections of the film of varying densities and corresponding with the distinguishing indicia on the light-controlling means.

3. The combination in a photographic printing machine, with means to control the intensity of the printing light, including a member graduated to represent the degrees of intensity of the light, and also graduated to represent the number of scenes or densities of a negative film, from which a positive film is to be printed, indicia designating the last-named graduations, an element to coact with said graduated member, the element and member adapted for relative movement in accordance with the graduations indicating the various scenes or densities of the film, means to control the relative movement of the member and element; and a negative film with which the controlling means coacts to permit a relative movement of the member and element to vary the intensity of the printing light; of indicia applied to the film, such indicia corresponding to the indicia designating the graduations representing the various scenes or densities on the graduated member.

4. The combination in a photographic printing machine, with means to control the intensity of the printing light, including a member graduated to represent the degrees of intensity of the light, and also graduated to represent the number of scenes or densities of a negative film, from which a positive film is to be printed, indicia distinguishing the last-named graduations, an element to coact with said graduated member, the element and member adapted for relative movement in accordance with the graduations indicating the various scenes or densities of the film, a feeler to control the relative movement of the member and element; and a negative film with which the feeler contacts, the film being mutilated at points adjacent the sections of varying densities, to permit an operation of the feeler and a consequent relative movement of the member and element to vary the intensity of the printing light; of indicia applied to those sections of the film of varying densities, such indicia corresponding to the indicia distinguishing the graduations representing the various scenes or densities on the graduated member; and a light to illuminate the indicia applied to the film.

5. The combination in a photographic printing machine, with means to control the intensity of the printing light, including a series of rows of seats formed therein, the rows of seats being designated in accordance with the various intensities of the printing light, there being a plurality of rows of seats to accord with different densities of the film, contact plugs accommodated in the seats appropriated to the rows indicating different intensities of light, the plugs being located successively in accordance with the varying densities of the film, and a switch element to coact with the contact plugs, the switch element adapted for movement relatively to the plugs, a feeler to control such movement; and a negative film adapted to travel past and be contacted by the feeler, and being mutilated to permit operation of the feeler, with a consequent movement of the switch, and a variation in the intensity of the printing light; of indicia placed on the negative film to distinguish the sections of different densities of the film, such indicia corresponding with the indicia on the light-control means for indicating the various densities of the film.

6. The combination in a photographic printing machine, with a light change box having adjustable contacts to determine the degree of light, a switch bar adapted to advance step by step, and coact with the contacts, to regulate the intensity of the printing light, indicia arranged in sequence to designate the several positions which the switch bar successively occupies; and a negative ribbon of film having sections of varying densities, adapted to be fed through the machine; of indicia associated with the sections of varying densities to distinguish the latter, such indicia adapted for comparison with the indicia which designate the several positions of the switch bar, whereby the correct operation of the machine may be determined.

7. The combination in a photographic printing machine, with adjustable means to vary the intensity of the printing light, such means normally adapted to advance step by step; indicia arranged in sequence to designate the various positions which the adjustable means is adapted to assume; and a negative film having portions of different densities; of distinguishing indicia applied to the negative film where such portions of different densities occur to apprise the operator of the necessity of adjusting the means which vary the intensity of the printing light to accord with the density of the particular portion of the film at that time being printed, such indicia on the film corresponding with the indicia representing the positions, which the adjustable means is adapted to assume.

8. The combination in a photographic printing machine, with adjustable means to vary the intensity of the printing light, such means normally adapted to advance step by step; indicia arranged in sequence to distinguish the various positions which the adjustable means is adapted to assume; and a negative film having sections of different densities; distinguishing indicia applied to the otherwise blank portions of the negative film adjacent the points where such sections of different densities occur, to apprise the operator of the necessity of adjusting the means which vary the intensity of the printing light to accord with the density of the particular section of the film at that time being printed, such indicia on the film corresponding with the indicia distinguishing the various positions which the adjustable means is adapted to assume; and a light to illuminate the negative film at one portion of its travel, to enable the operator to read the indicia thereon and compare it with the indicia designating the particular position of the adjustable means for varying the intensity of the light.

9. The combination in a photographic printing machine, with adjustable means to vary the intensity of the printing light, such means normally adapted to advance step by step; indicia arranged in sequence to distinguish the several adjustments; and a negative film having sections of varying densities; of indicia applied to the negative film where such sections of varying densities occur to enable the operator to determine whether or not the position of the adjustable means for varying the intensity of the printing light accords with the position which it should occupy when printing that particular section of the film.

10. The combination in a photographic printing machine, with adjustable means to vary the intensity of the printing light, such means normally adapted to advance step by step; indicia arranged in sequence to distinguish the several adjustments; and a negative film having sections of varying densities; of indicia applied to the negative film to identify such sections of varying densities, and corresponding with the indicia associated with the adjustable means, to enable the operator to determine whether or not the number of increments of movement through which the adjustable means has advanced corresponds with the indicia on the particular section of film at that time being printed.

11. The combination in a photographic printing machine, with adjustable means to vary the intensity of the printing light, such means normally adapted to advance step by step; consecutive characters to identify the successive adjustments; and a negative film having sections of different densities; of characters applied to the otherwise blank portions of the successive sections of the negative film, which characters correspond with the characters identifying the successive steps of travel of the adjustable means.

12. The combination in a photographic printing machine, with means to control the intensity of the printing light, including a switch element adjustable to different positions successively, indicia arranged in sequence to distinguish the various positions which the switch is adapted to assume; and a negative film of varying densities adapted to be fed through the printing machine; of indicia applied to the film at such points of varying densities, to indicate the degrees of intensity of light by which such portions should be printed.

13. The combination in a photographic printing machine, with means to control the intensity of the printing light, including a light controlling member having vertical rows of seats, plugs removably insertible in the seats in accordance with a predetermined program; a series of indicia associated with the rows of seats in one direction, to represent and distinguish the degrees of intensity of the light, and another series of indicia associated with the rows of seats in a direction at substantial right angles to the first-named series of indicia, to represent and distinguish the number of scenes or densities; an automatically actuated switch bar and indicator cooperating with the plugs and the series of indicia; and a negative film mutilated at desired points to control the operation of the switch bar and indicator with a consequent variation in the degree of intensity of the light in accordance with a predetermined plan; of indicia applied to the film at points adjacent the mutilations, such indicia designating the successive scenes or densities of the negative film, and also the degrees of intensity of the light with which such scenes or densities should be printed, to enable the operator at any time, to check the actual scene or density, and the intended degree of light intensity, with the indicia designated by the indicator as being the particular scene or density, and light intensity for which the machine is set.

14. As a means to prevent misprinting of motion picture film, the combination with a photographic printing machine, having a printing light, and graduated means to control the intensity of such light; of checking indicia applied to the sections of successively varying densities of the negative film ribbon, which varying densities require variations in the intensity of the light by which the positive film is printed, and which checking indicia correspond with the graduate light controlling means.

15. The combination with a film printing machine, including a printing light, and controlling means adjustable automatically in one direction step by step, to vary the intensity of the light, such means having indicia to differentiate the various adjustments of which it is capable; and a negative film notched at points where variations in the intensity of the light are to be effected, and adapted to feed through the printing machine, of checking indicia placed on the film adjacent those portions where variations in the intensity of the light are to be effected, such checking indicia corresponding with the indicia on the controlling means.

ROBERT W. JONES.